UNITED STATES PATENT OFFICE.

WILLIAM H. SMITH, OF PHILADELPHIA, PENNSYLVANIA.

IMPROVEMENT IN UTILIZING SLAGS OF FURNACES.

Specification forming part of Letters Patent No. 9,459, dated December 7, 1852; Reissue No. 252, dated January 3, 1853.

*To all whom it may concern:*

Be it known that I, WILLIAM H. SMITH, of Philadelphia, in the State of Pennsylvania, have invented a new and useful method or process for producing a new kind of ware, which I denominate "Lava-Ware," from the vitrifiable compounds or substances ejected from furnaces for the smelting of iron and other metals, called "slag" or "scoria," of which the following is a full, clear, and exact description.

In smelting iron and other metals from the ores by the admixture of other mineral substances to make the flux, a liquid mass termed "slag" or "scoria" is produced, and at stated times discharged from the furnace in the melted or liquid state. From the vitreous appearance of this substance or compound and the great accumulation of it around furnaces many attempts have been made to apply it to some useful purpose in the arts, but until my invention I believe without success.

The object of my invention is by a new process to produce a new kind of ware which can be employed instead of glass, earthen, and stone ware, and in some instances instead of marble and other stone, and even metal; and the nature of the first part of my invention consists in taking the slag or scoria in the highly-heated and fluid state in which it is usually discharged from the furnace, and, after permitting it to settle to separate the impurities, drawing it off and giving it the required form by molding into highly-heated molds or forms; and the nature of my invention also consists in obtaining the said slag or scoria in a vitreous condition, that it may be remelted to produce ware in accordance with the first part of my invention, by casting it into thin plates or sheets, causing it to run on cold plates of iron or other substance of good conducting property, so that these slabs or sheets may then be remelted to be made into ware by molding, blowing, and pressing, as in the process of manufacturing glass.

To enable any one skilled in the arts most nearly connected to work my said process, I will particularly describe the mode of procedure which I have practiced with success.

I make the molds of whatever form desired, of iron or soapstone or other refractory substance, and after heating them to a high degree of temperature—say 1000° of Fahrenheit's scale, more or less—I place them conveniently for filling. I then take a vessel of sufficient capacity to contain one discharge of slag or scoria from an iron-smelting furnace, the said vessel being made of iron or other substance which will resist the temperature of the slag or scoria at the temperature at which it is ejected from the furnace. Instead of such a vessel, the iron-smelting furnace, whether reverberatory or of any other form, may be constructed with a chamber at the side and heated by the heat of the smelting-chamber, so that the slag or scoria can run directly into this side chamber from the stack and there be kept in the melted state; but whether thus collected in a chamber connected with and heated by the furnace or discharged at given periods into a separate vessel, it must be permitted to rest and settle from five to ten minutes, more or less, during which time the impurities and non-fused matter will subside or rise to the surface and form a covering to protect the liquid mass below from the action of the atmosphere, which is very injurious. After the liquid mass has thus settled, I draw it off through a suitable hole near the bottom and fill the molds or other forms previously heated, as before stated, and so soon as they reach the solid state, either in or out of the molds, inclose them in a highly-heated oven, that they may cool slowly and without contact with the atmosphere.

I have ascertained by experiment that the ware anneals best when the temperature of the oven at the time the slag is placed therein corresponds with that of the slag when removed from the mold to the oven. After they have been thus annealed, they can be removed from the oven, and the wares will then be found to be of great strength and beauty, and generally with a highly-polished surface.

When the articles are taken out of the molds, before being placed in the annealing-oven, it is sometimes important to prevent the contact of the surfaces by interposing clay or other refractory substance to prevent injury to the surfaces during the annealing process. In this way slabs, tiles, plates, and a great variety of articles such as have heretofore been made of earth, stone, and glass may be produced. If I find the molten slag or scoria not sufficiently fluid and containing uncombed gases, I add a small quantity of alkali, such as soda-ash or other equivalent alkali. And so with reference to the color. If I desire a change of color, I add the coloring-matter, as in the well-known processes of coloring glass.

For producing blown and pressed ware, after the manner of making blown and pressed glass or molded ware of superior quality, I cause the slag or scoria to run from the smelting-furnace into a reverberatory or other like furnace, where it will be subject to a high temperature, and there subject it to the process of refining by the addition of alkalies, as above stated, occasionally stirring the mass until the desired degree of fluidity is obtained; and in like manner the substance or substances may be introduced for varying the color. After this, it can be run into molds, as above described, or blown or pressed, as in the process of making glassware.

When worked in the reverberatory furnace, the mass of slag or scoria can be maintained until all worked up at the temperature that it had when discharged from the smelting-furnace, or the temperature can be raised if a more fluid condition should be desired, as in the case of producing blown ware.

In the annealing precess care should be taken to protect the articles against the danger of rapid cooling, which not only renders them brittle, but often breaks them. When I desire to produce articles of great toughness or of diversified surface or texture, I cover them with clay, pulverized soapstone, ashes, sand, or other bad conductor previously heated. The color and texture will also be affected and changed by covering the articles during the process of annealing.

When the form of the article is such that the surface is accessible while in a highly-heated state, various substances may be embedded in or applied to the surface for ornament.

When the slag or scoria is not sufficiently good or fluid when ejected from the smelting-furnace to be advantageously worked or molded by either of the modes above described, I cast it into thin plates, say, from one-eighth to one-half of an inch in thickness, running it onto cold metallic plates or shallow vessels made of some good conductor, so as to chill the molten mass, and thus I obtain the substance in a perfectly vitreous condition, and avoid the devitrified and striated appearance which is presented by slag or scoria when discharged from the furnace and suffered to cool in the usual way. The plates thus cast can then be remelted and worked in the manner of making glassware or by molding; and if to be worked by blowing, an alkali or alkalies should be added to hasten the "melt" and soften the mass.

I have thus described the mode of procedure which I have practiced with success; but I do not wish to be understood as limiting myself to the special details specified, but to vary these at pleasure, while I attain the same ends by means substantially the same.

What I claim as my invention, and desire to secure by Letters Patent, is—

1. The process, substantially as described, of producing ware from the slag or scoria ejected from smelting-furnaces for reducing iron, copper, zinc, and other metals by separating therefrom and casting, molding, blowing, or pressing the same in the heated state, as it comes from the smelting-furnace, and then annealing, whether additional heat be applied or not, substantially as and for the purpose specified.

2. The method of obtaining slag or scoria from smelting-furnaces in a vitrified state, fit for remelting to be worked into ware, substantially as described, by casting it into thin sheets onto cold plates of metal or other good conducting substance, as specified.

WILLIAM H. SMITH.

Witnesses:
WM. H. BISHOP,
CHAS. W. BAMBURGH,
H. C. BANKS.